United States Patent [19]

Kirn

[11] Patent Number: 4,941,790

[45] Date of Patent: Jul. 17, 1990

[54] CLAMP DEVICE FOR AXIALLY CLAMPING A TOOL, PARTICULARLY A DISC

[75] Inventor: Manfred Kirn, Stuttgart, Fed. Rep. of Germany

[73] Assignee: Robert Bosch GmbH, Stuttgart, Fed. Rep. of Germany

[21] Appl. No.: 391,535

[22] PCT Filed: Jan. 12, 1988

[86] PCT No.: PCT/EP88/00015

§ 371 Date: Jul. 24, 1989

§ 102(e) Date: Jul. 24, 1989

[87] PCT Pub. No.: WO88/06075

PCT Pub. Date: Aug. 25, 1988

[30] Foreign Application Priority Data

Feb. 21, 1987 [DE] Fed. Rep. of Germany ....... 3705638

[51] Int. Cl.[5] .................. F16B 37/08; B24B 45/00; B27B 5/32
[52] U.S. Cl. ................................. 411/432; 411/535; 403/259; 403/261
[58] Field of Search ............ 411/6, 7, 532, 533, 411/535, 536, 956; 403/259, 261, 374, 409.1, DIG. 4; 192/8 R; 188/82.3, 82.84

[56] References Cited

U.S. PATENT DOCUMENTS 2,290,215 7/1942 Stenberg .
4,525,097 6/1985 Ziegelmeyer .................. 403/259

FOREIGN PATENT DOCUMENTS

| 15327 | 9/1980 | European Pat. Off. . |
| 231500 | 8/1987 | European Pat. Off. . |
| 946318 | 7/1956 | Fed. Rep. of Germany . |
| 1925017 | 11/1970 | Fed. Rep. of Germany . |
| 2809569 | 9/1979 | Fed. Rep. of Germany . |
| 2101513 | 3/1972 | France . |
| 163837 | 8/1949 | German Democratic Rep. ............ 411/535 |
| 480511 | 5/1953 | Italy .................. 411/433 |

Primary Examiner—Neill R. Wilson
Attorney, Agent, or Firm—Michael J. Striker

[57] ABSTRACT

A clamp device for clamping a disc tool to a driven spindle and comprising a clamp nut, a clamp disc, and an arrangement for connecting the clamp disc to the clamp nut and which arrangement includes a ring having an inner track in which a plurality of rolling members are displaceable and are spring biased against respective stops projecting from at least one of the clamp nut and the clamp disc, and which is rotatable against a spring force to release the clamp disc from the clamp nut.

20 Claims, 4 Drawing Sheets

CLAMP DEVICE FOR AXIALLY CLAMPING A TOOL, PARTICULARLY A DISC

BACKGROUND OF THE INVENTION

The invention relates to a clamp device for axially clamping a tool, particularly a disc, and which comprises a clamp nut and a clamp located between the disc and the clamp nut and connected with the clamp nut with a possibility of an axial movement relative thereto. Clamp devices of this kind are mainly suitable for portable hand machine tools and in this connection particularly grinding machines. A clamp device of the kind mentioned is known (German Patent Specification No. 3,012,836), in which the clamp disc consists of a member which has an approximately hat-shaped cross-section and which is supported axially against the flange of the clamp nut by a coil spring. When the clamp nut is screwed on and tightened, this clamp disc is pressed axially against the tool by the axially compressed spring and thus the tool is tightened against the flange on the spindle side, while the, end face of a cylindrical extension of the clamp nut abuts directly against a facing axial side of the flange on the spindle side and, when the clamp nut is further tightened the flange on the spindle side is tightened, together with the clamp nut, possibly until the rear flange abuts axially against the spindle shoulder surface forming the supporting member. It is thereby intended, in the case of an angle grinder, to enable the grinding wheel to be clamped with a predetermined contact pressure and to ensure that this contact pressure is maintained. This clamp device is also intended to allow rapid and, simple changing of the grinding wheel and at the same time, to avoid overloading of the hand machine tool, particularly of the angle grinder. If in fact the torque acting on the grinding wheel is too high, the grinding wheel stops whereas the rear flange and the clamp nut together with the clamp disc make a relative movement in relation to it. This clamp device counteracts the effect of the further spontaneous tightening of the clamp nut during operation, which would otherwise make it considerably more difficult to loosen the clamp nut for the purpose of changing the grinding wheel. Nevertheless, the clamp nut can here be unscrewed only with aid of a special auxiliary tool, while, depending on the construction of the machine, the spindle has to be securely held correspondingly fast with a second auxiliary tool, for example a spanner.

SUMMARY OF THE INVENTION

The object of the invention is to provide a clamp device which makes possible to change the tool without any auxiliary tool, while in addition this tool change can be made quickly and reliably. The object of the invention is achieved by providing a clamp device of the type mentioned above in which the clamp disc and/or the clamp nut is (are) provided with stops for respective rolling members guided on tracks of an operating member disposed between the clamp nut and clamp disc, and the operating member is spring-loaded in a direction which is opposite to the nut release direction. Another advantage of the clamp device according to the invention is that even existing hand machine tools can be converted without any particular reconstruction. For this purpose, it is for example sufficient simply to replace the existing conventional clamp nut with the complete unit consisting of a clamp nut with clamp disc and operating member. In the externally accessible region the clamp nut can still in all respects be of conventional construction, for example in conformity with standards, so that in particularly obstinate cases, for example when the clamp nut has severely rusted, a spanner can still be applied and the clamp nut released with this auxiliary tool. The same principle in accordance with the clamp device according to the invention can also be put into practice for the rear flange on the spindle side, in which case this flange is then replaced with the complete unit consisting of a clamp nut with clamp disc and operating member, the clamp disc then is pressed at the rear against the tool.

It may be sufficient for the supporting members to have corresponding inclined support surfaces only on one axial side, while an inclined supporting surface with the same angle of inclination is then present on the facing axial side of the clamp nut or clamp disc. On the opposite axial side of the supporting members the support surface and also the appertaining supporting surface of the clamp disc or clamp nut may be in the form of a radial surface without inclination. However, the construction with inclined support surfaces of the supporting members on both sides, with in each case appertaining annular surfaces, provided with a corresponding angle of inclination, of the clamp nut on the one hand and the clamp disc on the other, is of advantage. The rolling members, particularly balls, are held and guided radially between the annular surfaces of the operating member and supporting members. In order to secure the rolling members, particularly balls, in the axial direction it is sufficient for at least one of these two annular surfaces to be provided with a track groove adapted to the radius of the balls. It is advantageous that, in dependence on the angle of inclination of the supporting members in the individual case, only a part of the axial clamp pressure is transmitted to the rolling members, particularly balls, and thus to the operating member. The rolling members, particularly balls, are thus not very heavily stressed.

The present invention both as to its construction so to its mode of operation, together with additional objects and advantages thereof, will be best understood from the following detailed description of the preferred embodiments with reference to the accompanying drawings.

DESCRIPTION OF THE PREFERRED EMBODIMENTS

Figure 1:
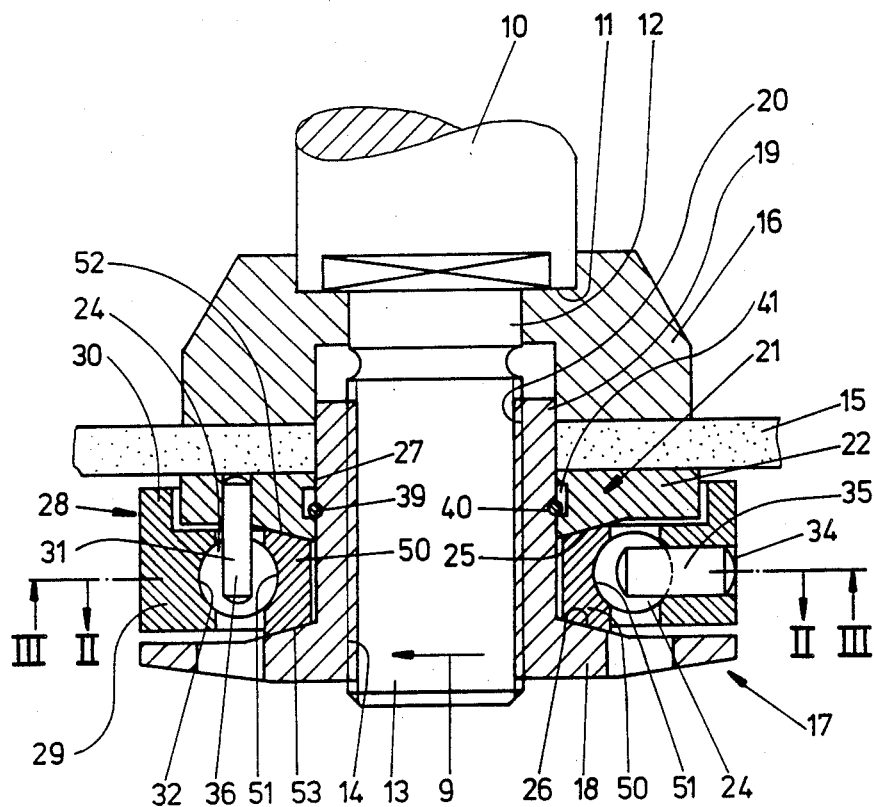
FIG. 1 is a schematic axial longitudinal cross-sectional view along line I—I in FIG. 2 of a clamp device of an angle grinder with a clamped grinding wheel, according to the invention.

The drawings show the bottom part of a portable hand machine tool, for example in the form of an angle grinder, which has a spindle 10 which is motor-driven through gearing (not shown) and at its end merges by way of an annular shoulder 11 into a cylindrical neck 12 of smaller diameter and then into a threaded end neck 13 which has an external thread 14. The spindle 10 serves to drive a tool 15, which consists for example of a grinding wheel indicated or of some other tool wheel, a rubber plate, or the like. The tool 15 is inserted and clamped fast between a flange 16 and a clamp member, which is part of a clamp nut 17 and will be further described later on. The flange 16 is supported axially against the annular shoulder 11 and radially centered on the cylindrical neck 12. By means of matching shaped surfaces, for example two flats parallel to one another, on the spindle 10 and on the flange 16 the latter is positively connected to the spindle 10 to rotate with the latter, being driven by said spindle in the direction of rotation indicated by the arrow 9 when the motor is switched on. This direction of rotation in accordance with the arrow 9 corresponds to the working direction of the tool 15 in which the latter is driven. In the plan view shown in FIG. 2 this corresponds to the clockwise direction. The clamp nut 17 had a flange 18 and a hub 19 in the form of a cylindrical sleeve projecting from said flange and provided in said hub with an internal conventional thread 20 by which the clamp nut 17 is screwed onto the external thread 14 of the threaded neck 13. The tool 15 is centered on the external peripheral surface of the hub 19 when it is fastened.

In the axial region between the tool 15 and the clamp nut 17, a clamp disc 21 is disposed which has a clamp plate 22 pressing against the tool 15. The clamp disc 21 is adapted to be loaded by the clamp nut 17 with an axially directed compressive force and to press axially against the tool 15, thus pressing the latter firmly against the axial end face of the flange 16.

The clamp disc 21 is coupled to the clamp nut 17 in such a manner as to be axially movable but not rotatable. Supporting members 50 are disposed axially between the clamp disc 21 and the flange 18 of the clamp nut 17. A supporting surface in the form of an annular surface 26 is allocated to the supporting members 50 on the facing side of the flange 18 of the clamp nut 17. A supporting surface is also allocated to the opposite axial side of the supporting members 50 and consists of an annular surface 25 on the facing side of the clamp plate 22 of the clamp disc 21.

Between the clamp disc 21 and the clamp nut 17 is disposed an operating member 28 in the form of a ring 29, which by of an annular collar 30, provided at the top in FIG. 1, engages over, the clamp plate 22 in the axial direction, leaving motion clearance between them. The annular collar 30 ends axially at a distance from and, as seen in FIG. 1, below the end face of the clamp plate 22 which lies against the tool 15. The ring 29 is arranged axially with motion clearance between the clamp disc 21 and the clamp nut 17, and is held in such a manner as to be rotatable relative to the clamp disc and the clamp nut. The ring 29 includes an interior annular surface 32, whose cross-section is approximately channel-shaped and which in another exemplary embodiment, which is not illustrated, may also be cylindrical. At the same axial height the supporting members 50 are provided on their radially outer peripheral surface with a corresponding annular surface 51 provided with a groove-like depression. The supporting members 50 are radially loaded by means of rolling members 24 which are guided and roll on the annular surfaces 32 and 51, and which here consist of balls. In the exemplary embodiment illustrated, three balls 24 are provided, which are disposed at approximately equal peripheral angular distances apart and which are guided on the annular surfaces 32 and 51 concentric to the center axis and are in this manner in contact with the supporting members 50, on the one hand, and the operating member 28 on the other hand. The operating member 28 applies a force to the balls 24, which are pressed against stops 31 on the clamp disc 21 by the operating member in the direction corresponding to the clamping direction, which is opposite to the direction indicated by the arrow 9. This clamping condition is shown in FIGS. 1 to 5.

Figure 2:
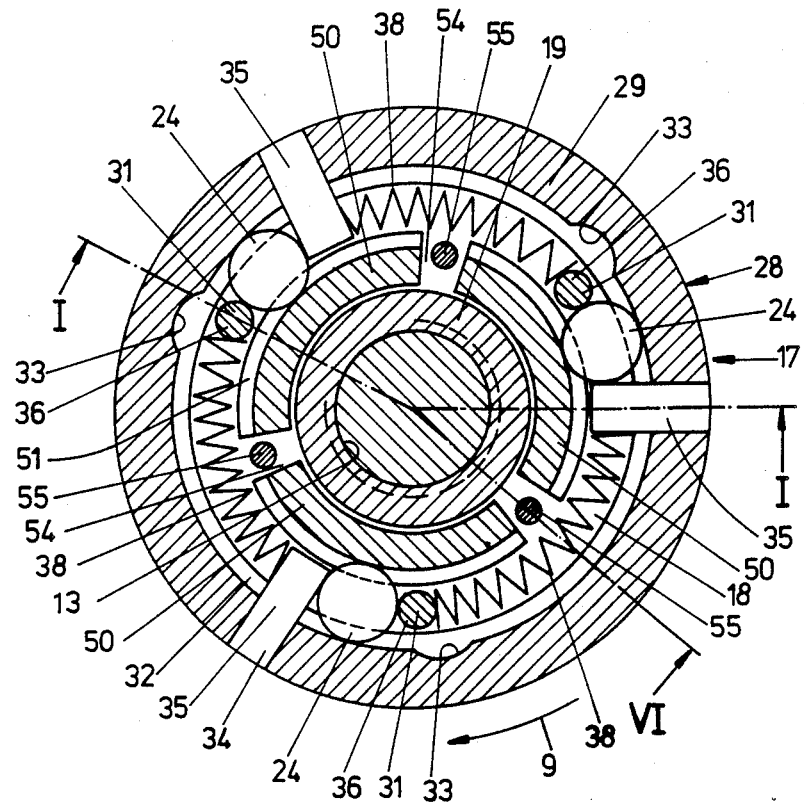
FIG. 2 is a schematic cross-sectional plan view along the line II—II n FIG. 1.
Figure 3:
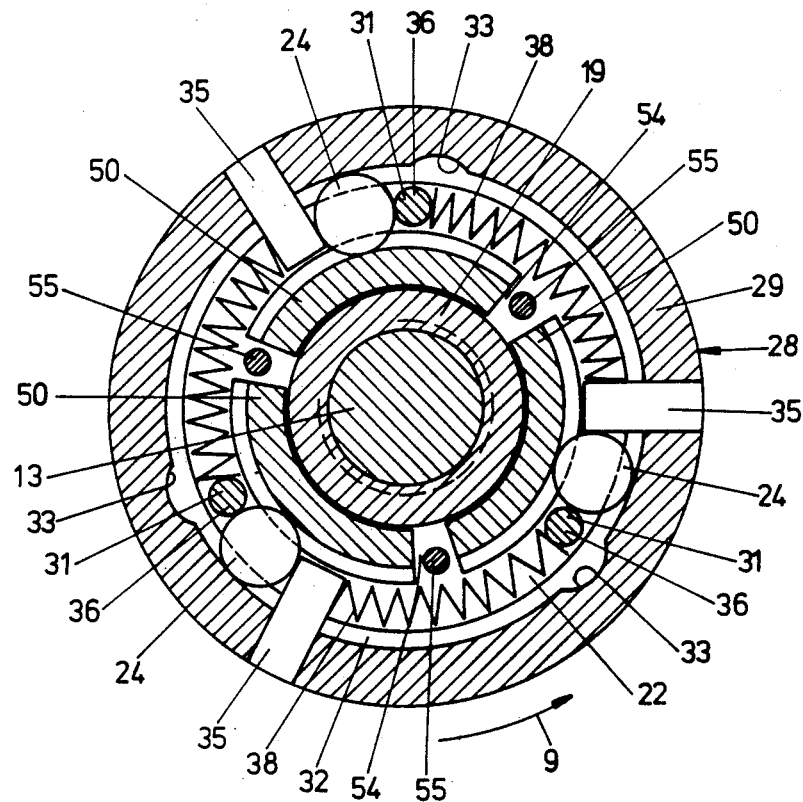
FIG. 3 is a schematic cross-sectional plan view along the line III—III in FIG. 1.
Figure 4:
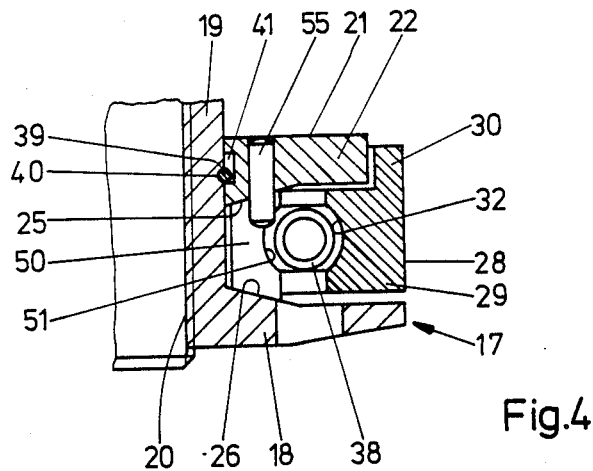
FIG. 4 is a schematic cross-sectional view along the line IV—IV in FIG. 2.

As can be seen from FIGS. 2 and 3, in the region of the annular surface 32 of the operating member 28, a recess 33 is included and allocated to each ball 24, each of these recesses consisting of a depression in the annular surface 32 and being in particular in the form of a ball pocket which is sunk outwards in the radial, direction and is open in the direction of the center. Each recess 33 is of a such a nature that when the balls 24 roll and reach the respective allocated recess 33, the balls 24 can move outwards in the radial direction, whereby the supporting members 50 are relieved of a radial load, so that the supporting members 50 can move, at least slightly, radially from inside to outside. In this connection it is sufficient for at least one of the two annular surfaces 25, 26, between which the supporting members 15 are axially disposed, to be frustoconical in shape and at the same time be constructed with the cone apex aligned in such a manner that, on this relief of radial load and this radial displacement on this inclined annular surface 25 and/or 26 the supporting members 50 allow an axial movement of the clamp disc 21 in the direction of the clamp nut 17, at least with a slight reduction of the axial distance, so that the clamp disc 21 is relieved of the clamping pressure.

In the embodiment illustrated, both the supporting annular surface 25 of the clamp disc 21 and the supporting annular surface 26 of the clamp nut 17 are frustoconical in shape and constructed in the manner described, so that the two annular surfaces 25, 26 together form a keyway. The supporting members 50 are provided, both on the axial side facing the annular surface 25 and on the opposite axial side, with support surfaces 52 and 53 respectively which correspond to the shape of the respective annular surface 25 or 26. In the exemplary embodiment illustrated, each supporting member 50 has an approximately wedge-shaped cross-section, the wedge angle corresponding at least substantially to that of the keyway formed by the annular surfaces 25, 26. As can be seen in FIGS. 2 and 3, the individual supporting members 50 are in each case in the form of circular annular segments. In the exemplary embodiment illustrated three such circular annular segment-shaped supporting members 50 are provided, which are disposed approximately at equal peripheral angular distances apart. In this arrangement gaps 54 are in each case left between adjoining supporting members 50, into which gaps approximately axially parallel positioning members 55 in the form of pins project. These pins 55 are situated outside the rolling range of the balls 24, so that they do not hinder the rolling movement of the balls between the annular surfaces 32 and 51. In the embodiment illustrated, the pins 55 are fastened on the clamp disc 21 and project beyond its supporting annular surface 25. In another exemplary embodiment which is not illustrated the pins 55 are instead fastened on the clamp nut 17. The pins 55 position the supporting members 50 in the peripheral direction and ensure that the supporting members 50 do not move in the peripheral direction.

For each ball 24, the operating member 28 is provided with a fixed driver 34 in the form of a radial pin 35 which is firmly fastened on to the ring 29 and projects radially from outside to inside into the path of the respective ball 24 lying in front of it, at least sufficiently far that it bears for example approximately tangentially against the respective ball 24 lying in front of it.

The stops 31 on the clamp disc 21 consist of approximately axially parallel longitudinal pins 36 which extend approximately axially parallel through the guide groove formed conjointly by the annular surfaces 32 and 51 for the balls 24, in such a manner that a sufficient gap is left between the inner surface of the ring 29 and the longitudinal pins 36, so that on the relative rotation between the operating member 28, on one hand and the clamp nut 17 together with the clamp disc 21, on the other hand, the longitudinal pins do not grind against the operating member 28. The longitudinal pins 36 are situated in each case on the other side, lying opposite to the radial pin 35 for each ball 24, of the respective appertaining ball 24. In the clamping position shown in FIGS. 1 to 5, with the tool 15 clamped fast and the motor switched on, the clamp disc 21 is also driven in the working direction indicated by the arrow 9 by means of the clamping force and friction with the tool 15. Since the clamp disc 21, although adapted to make relative axial movements, is nevertheless coupled to rotate with the clamp nut 17 in the peripheral direction, the clamp nut 17 is thereby also similarly driven. The longitudinal pins 36 thus strike in the direction of the arrow 9 against the respective balls 24 lying in front of them, and these balls thus press against the respective radial pins 35 on the operating member 28 which lie in front of them. The operating member 28 is spring-loaded oppositely to the direction of rotation which is indicated by the arrow 9, which at the same time corresponds to the release direction. This is achieved by means of respective cylindrical coil springs 38 which are disposed inside the guide groove formed by the annular surfaces 32 and 51 for the balls 24 and which act in the peripheral direction. Each coil spring 38 is here disposed in the peripheral region between a longitudinal pin 36 and a radial pin 35 and at its ends is supported against them. By these coil springs 38 the operating member 28 is elastically spring-loaded relative to the clamp nut 17 and clamp disc 21 in the direction opposite to that indicated by the arrow 9, in such a manner that the respective radial pin 35 presses the respective ball 24, lying in front of it in the opposite direction to that indicated by the arrow 9 against the longitudinal pin 36 lying in front of it. By the coil springs 38, the operating member 28 is consequently held, relative to the clamp nut 17 with the clamp disc 21, in the clamping position shown in FIGS. 1 to 5.

The clamp disc 21 is secured axially on the clamp nut 17 in such a manner that an at least slight axial movement between them is possible. The clamp disc 21 has in the region of the clamp plate 22 an internal through surface 27 which in principle may be cylindrical, through which the hub 19 of the clamp nut 17 extends, and on which the clamp plate 22 is centered and is held and guided to be axially movable at least within limits. To secure it, use may be made of a spring ring 39, which is only indicated schematically in FIG. 1 and which is received with a substantially accurate fit in a groove 40 in the outer peripheral surface of the hub 19 of the clamp nut 17, in such a manner that approximately half the crosssection of the spring ring 39 penetrates into the groove 40, while the other half of its cross-section projects radially. On its inner surface 27 the clamp disc 21 includes a groove 41 which is allocated to the spring ring 39, but which has a greater axial width than the spring ring 39 and the groove 40. The radially measured depth of the groove 41 corresponds approximately to the other half of the cross-section of the spring ring 39. It is not especially shown that the flanks of the groove 40 and/or 41 may be bevelled, thus enabling the clamp disc 21 and clamp nut 17 to be easily pushed together, and subsequently released, in the axial direction. In the above-described construction with a cylindrical inner surface 27 and a cylindrical outer surface of the hub 19, the torque-transmitting coupling between the clamp disc 21 and the clamp nut 17 is for example made via the longitudinal pins 36, which are extended axially as far as the flange 18 of the clamp nut 17 and engage with axial sliding clearance in bores provided there.

Figure 5:
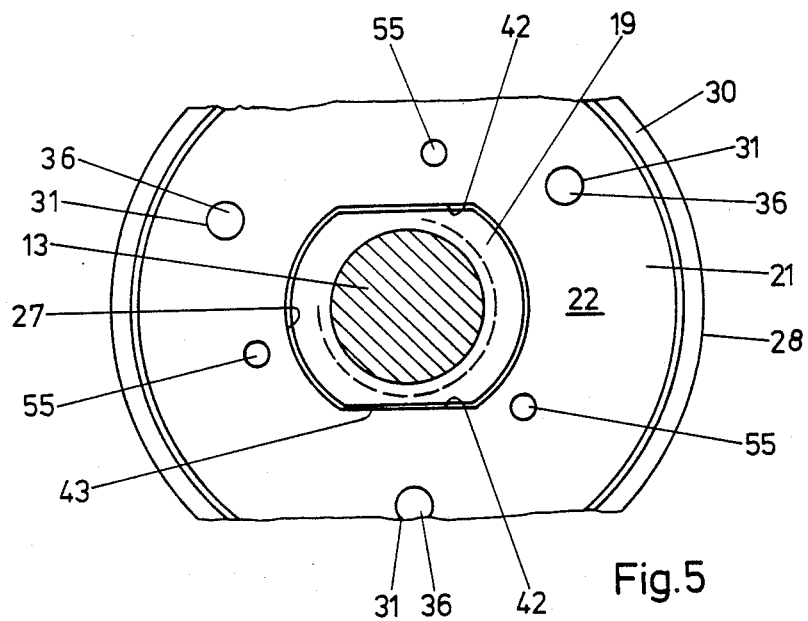
FIG. 5 s a schematic partially cross-sectional top plan view, showing parts of the clamp device.

In the embodiment illustrated, the positive coupling is instead made with the aid of external shaped surfaces. As shown in FIG. 5, the inner surface 27 of the clamp plate 22 of the clamp disc 21 differs from the cylindrical shape and has two diametrically opposite flat surfaces 42. In a corresponding arrangement, the hub 19 of the clamp nut 17 has corresponding external flat surfaces 43 in the same axial region, so that positive coupling is obtained in the peripheral direction through the flat surfaces 42 and 43, while nevertheless permitting axial relative movability, at least within limits. Instead of a spring ring 39, for example an approximately hairpin-shaped spring clip is provided, the two legs of which can be seen in section in FIGS. 1 and 4 and to which the description given above applies.

In the gaps between the ring 29 and the clamp disc 21, on one axial side of the former, and between the ring and the flange 18 of the clamp nut 17 on its other axial side it is possible to dispose sealing members, for example, foam rubber rings, which are not shown, and which provide a sealing action to prevent the penetration of dirt, for example dust, or the like. The sealing members are inserted during assembly.

FIGS. 1 to 4 show the clamp device described in its clamping position, in which the tool 15 is clamped fast axially against the flange 16 by the clamp disc 21, which is axially supported against the clamp nut 17 with the aid of the supporting members 50.

When the tool 15 is to be removed and changed, the flange 16 and/or the tool 15 are secured against rotation, which can be done, for example, by suitably locking the spindle 10, for example, by a spindle locking device built into the hand machine tool. In certain instances the friction in the gearing, extending to the motor, may also be sufficient to prevent the spindle 10, at least within limits, from rotating in the direction of the arrow 9. To release the tool, the operating member 28 is then turned by hand in the working direction indicated by the arrow 9, the radial pins 35 lifting off the balls 24 and, with compression of the coil springs 38, being moved in the peripheral direction in the direction of the longitudinal pins 36 of the clamp disc 21 which, together with the clamp nut 17, does not turn relative thereto. During this movement the balls 24 roll on the tracks formed by the annular surfaces 32 and 51, the balls 24 likewise travelling in the peripheral direction indicated by the arrow 9. As soon as the balls 24 in the course of this movement have reached the recesses 33 in the annular surface 32 of the operating member 28, the balls 24 enter these recesses 33 radially. The supporting members 50 are thus relieved, at least within limits, of the supporting force acting on them in the radial direction from outside to inside. The supporting members 50 can therefore move radially outwards with their inclined support surfaces 52, 53 on the correspondingly inclined annular surfaces 25 and 26 respectively. Because of the inclined surfaces, the clamp disc 21 can at the same time yield axially to the clamp pressure, that is to say, in the case shown view in FIG. 1, can at least slightly move axially in the direction of the clamp nut 17 and the ring 29, at least to such an extent that a corresponding axial release is achieved. Thereupon the complete unit, consisting of the clamp nut 17 with the clamp disc 21 and the operating member 28, can easily be completely unscrewed by hand. The relative turning movement of the operating member 28 for the axial release of the clamp disc 21 is limited by the fact that the radial pins 35 strike against the longitudinal pins 36 if the coil springs 38 were to be completely compressed. As soon as the axial release has been effected and the complete unit can easily be completely unscrewed by hand, unit can easily be completely unscrewed by hand, the balls 24 move back automatically because of the releasing coil springs 38. Through the spring pressure on the radial pins 35, the operating member 28 is turned, relative to the clamp nut 17 and clamp disc 21, back into the starting position shown in FIGS. 2 and 3, while because of the rolling movement of the balls 24 the latter are again moved out of the recesses 33 and back into the position shown. On the movement of the balls 24 out of the recesses 33 and in such a way that the balls are supported again on the annular surface 32 of the operating member 28, the balls 24 exert on the supporting members 50 a force directed radially from outside to inside, whereby said supporting members are forced back again into the starting position shown in FIGS. 1 to 4, in which the clamp disc 21 resumes the starting position shown in FIG. 1. In this position the complete unit, consisting of the clamp nut 17, together with the clamp disc 21, and the operating member 28, is ready to clamp a new inserted tool. For this purpose, it is sufficient to screw said complete unit onto the threaded neck 13 and to tighten it slightly in the opposite direction to the arrow 9, thereby slightly tightening the new tool 15, since when the motor is subsequently switched on, the tool 15 will tighten itself during operation.

The same principle of the clamp device according to the invention can also be realized in the case of the rear flange 16 on the spindle side, said flange then being replaced by the complete unit consisting of the clamp nut with the clamp disc and the operating member, and the clamp disc then being pressed at the rear against the tool. In addition, this principle can also be employed in other parts in a hand machine tool, for example in the form of a divided grinding spindle in the gearing.

The clamp device described is simple, inexpensive, and can be handled quickly, safely, and easily. It permits rapid and safe changing of the tool 15 without additional special tools being required for the purpose. A further advantage consists in that existing hand machine tools, particularly grinding machines, can also be equipped afterwards with this clamp device without further rebuilding. For this purpose, it is merely necessary to replace their conventional clamp nuts with the complete part comprising the clamp nut 17 with the clamp disc 21 and the operating member 28. Furthermore, the clamp nut 17 can be so constructed that it will, as hitherto, enable a special tool, for example in the form of a pin type face spanner, to be used on it if necessary, so that the clamp nut 17, and consequently the entire complete part, can thus also be released with the aid of an auxiliary tool of this kind in the usual way in particularly obstinate cases, for example in the rusted-on state. The clamp device is not limited to a grinding wheel serving as tool 15. On the contrary, other tools, for example clamp discs, brushes, rubber plates, sawblades in a circular saw, or the like, can also be clamped in the same way without the use of a tool.

While the invention has been illustrated and described as embodied in a clamp device for axially clamping a tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A clamp device for axially clamping a tool, in particular a disc, to a flange of a driven spindle, said clamp device comprising a clamp nut to be secured to the driven spindle; a clamp disc arranged between said clamp nut and the tool for pressing the tool to the flange; axial supporting means for securing said clamp disc to said clamp nut for joint axial movement thereof, said axial supporting means including a plurality of annular segments having an outer peripheral surface, a track on said outer peripheral surface, and a wedge-shaped cross-section, said clamp nut and said clamp disc having respective frustoconical supporting surfaces for engaging said annular segments; an operating member located between said clamp disc and clamp nut and comprising a ring rotatable relative thereto and having an inner track; a plurality of rolling members displaceable in said inner track of said ring and said outer tracks of said annular segments; a plurality of drivers associated with said rolling members, supported on said ring, and projecting into tracks of associated rolling members for enabling displacement of said rolling members in a release direction upon rotation of said ring in a predetermined direction to relieve said annular segments radially and said clamp disc axially, at least one of said clamp disc and clamp nut having a plurality of stops extending transversely into said tracks; and spring means for biasing said ring in a direction opposite to the predetermined direction of rotation thereof so that said drivers press associated rolling members against associated stops in a direction opposite to the release direction, said ring member having in a region of said inner track thereof a plurality of radial depressions into which said rolling members fall upon being displaced upon rotation of said ring in a predetermined direction.

2. A clamp device according to claim 1, wherein said plurality of annular segments includes three annular segments spaced by substantially equal peripheral angular distances.

3. A clamp device according to claim 1, wherein at least one of said clamp disc and clamp nut has a plurality of positioning members located outside said tracks for said rolling members and projecting beyond associated frustoconical supporting surfaces for positioning said annular segments in a peripheral direction.

4. A clamp device according to claim 3, wherein said positioning members extend substantially parallel to each other in a axial direction and each of said positioning members comprises a pin.

5. A clamp device according to claim 1, wherein said claim nut has a hub, said clamp disc having an inner surface with which said clamp disc is mounted on said hub, and said clamp disc being movable axially along said hub within predetermined limits.

6. A clamp device according to claim 5, wherein said clamp disc and said clamp nut each has a groove, said clamp device further comprising one of a spring ring and a substantially hairpin-shaped spring clip located in the groove of one of said clamp disc and clamp nut and positively engaging in the groove of the other of said clamp disc and clamp nut, one of said grooves having an axial width which is greater than one of a cross-section of said spring ring and legs of said hairpin-shaped spring clip.

7. A clamp device according to claim 6, wherein the groove in which the one of said spring ring and said hairpin-shaped spring clip is received, is formed in an outer surface of said hub and receives the one of said spring ring and said legs of said hairpin-shaped spring clip with a substantially precise fit, and said one of said grooves having a greater axial width is formed in an inner surface of said clamp disc.

8. A clamp device according to claim 1, wherein said clamp nut and clamp disc have complementary surfaces for positively connecting said clamp nut and said clamp disc in a peripheral direction with a possibility of relative movement in an axial direction.

9. A clamp device according to claim 8, wherein said complementary surfaces are flat.

10. A clamp device according to claim 1, wherein said plurality of rolling members comprises three rolling members disposed at substantially equal peripheral angular distances.

11. A clamp device according to claim 1, wherein said plurality of rolling members comprises a plurality of balls.

12. A clamp device according to claim 1, wherein said tracks of said annular segments are cylindrical.

13. A clamp device according to claim 1, wherein said inner tract of said ring is cylindrical.

14. A clamp device according to claim 1, wherein said tracks of said annular segments and said inner track of said ring are cylindrical.

15. A clamp device according to claim 1, wherein said tracks of said annular segments are formed as grooves.

16. A clamp device according to claim 1, wherein said inner track of said ring is formed as a groove.

17. A clamp device according to claim 1, wherein said tracks of said annular segments and said inner track of said ring are formed as grooves.

18. A clamp device according to claim 1, wherein each of said plurality of radial depressions has a shape of a portion of spherical pocket.

19. A clamp device according to claim 1, wherein said spring means comprises a plurality of springs, each of said plurality of springs extending in a peripheral direction between respective stop and driver for biasing a respective driver against a respective rolling member for pressing the respective rolling member against a stop located in front of it.

20. A clamp device according to claim 1, wherein each of said plurality of drivers comprises a radial pin and each of said plurality of stops comprises a longitudinal pin extending substantially parallel to a respective radial pin.

* * * * *